Jan. 29, 1963 | J. F. HUTTER ETAL | 3,075,556

PILOT OPERATED VALVE

Filed Dec. 30, 1959 | 2 Sheets-Sheet 1

INVENTOR
James F. Hutter
Leonard Kelly
BY Alex. E. MacRae
ATTORNEY

PILOT OPERATED VALVE

Filed Dec. 30, 1959 2 Sheets-Sheet 2

INVENTOR
James F. Hutter
Leonard Kelly
BY
ATTORNEY

United States Patent Office 3,075,556

Patented Jan. 29, 1963

1

3,075,556
PILOT OPERATED VALVE

James F. Hutter and Leonard Kelly, Bancroft, Ontario, Canada, assignors to K & H Equipment Limited, Toronto, Ontario, Canada Filed Dec. 30, 1959, Ser. No. 862,892
2 Claims. (Cl. 137—625.27)

This invention relates to pilot operated valves of the electrically controlled type.

It is sometimes desirable to provide a valve having a very high speed of operation whereby it is capable of performing a large number of cycles per minute and also having an exceptionally long life whereby it may meet satisfactorily certain operating conditions. For practical purposes, these characteristics are somewhat incompatible and, therefore, presently available valves are not fully effective in meeting such conditions.

An example of apparatus in which such a valve has utility is that of copending application, Serial No. 718,874, filed March 3, 1958, now Patent Number 3,011,634, in which a jet of air of high kinetic energy and short duration is used to change the trajectory of a piece of falling rock. The pieces handled range from one-half to forty pounds in weight and from one and one-half to twenty inches in length. They are in free fall and travelling at speeds up to fourteen feet per second. Since the blast of air must be proportional to the length of rock piece, it is evident that the reaction time of the air control valve must be exceedingly fast. Moreover, since the pieces of rock are quite heavy, it is necessary that the valve have good flow characteristics throughout its operating stroke.

Desirable requirements of such a valve may be summarized as follows:

(1) Capable of 1200 cycles per minute.

(2) Full flow therethrough as quickly as possible on energization.

(3) Minimum life of 25,000,000 cycles without servicing.

(4) Ease of service since in a continuous industrial process it is essential that down-time be reduced to an absolute minimum.

It is a general object of this invention to provide a valve which is capable of high speed operation, which has an exceedingly long life without the need of maintenance, which is effective in providing full flow therethrough substantially immediately on energization thereof, and which is subject to convenient maintenance.

Figure 1:
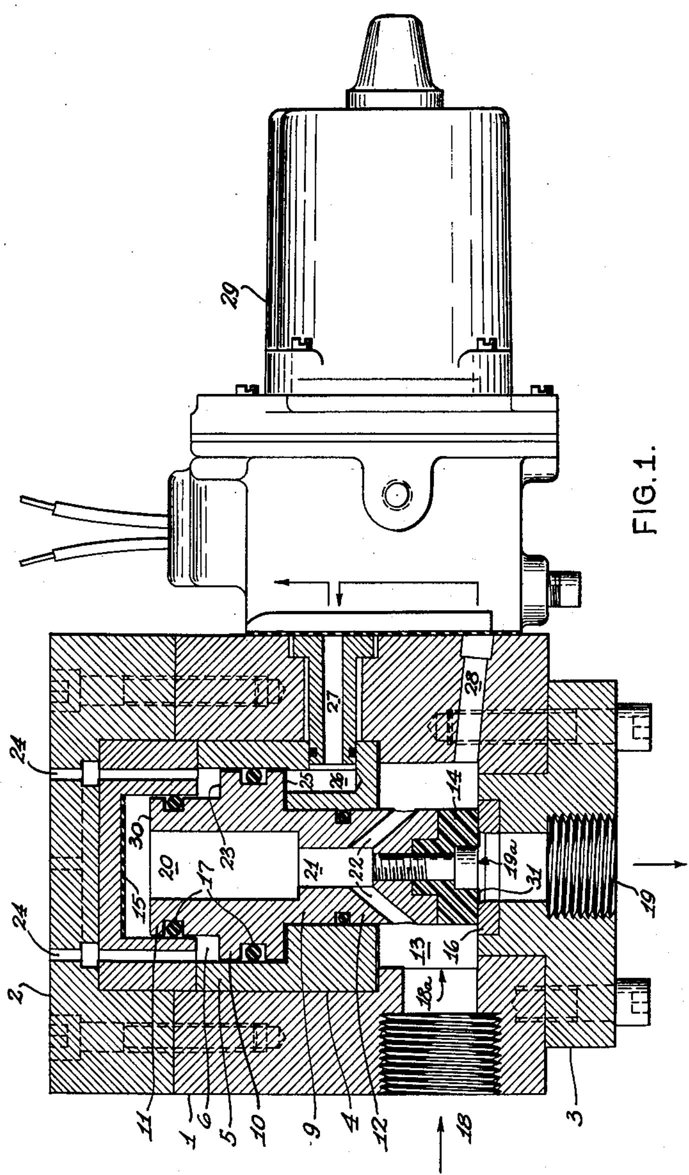
Figure 2:
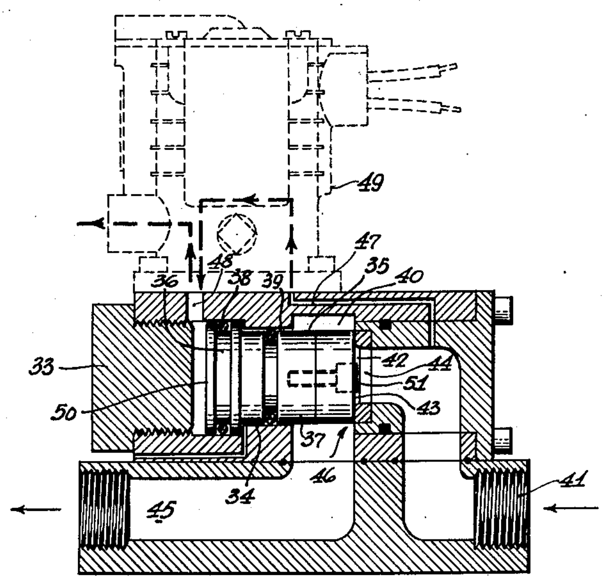
Figure 3:
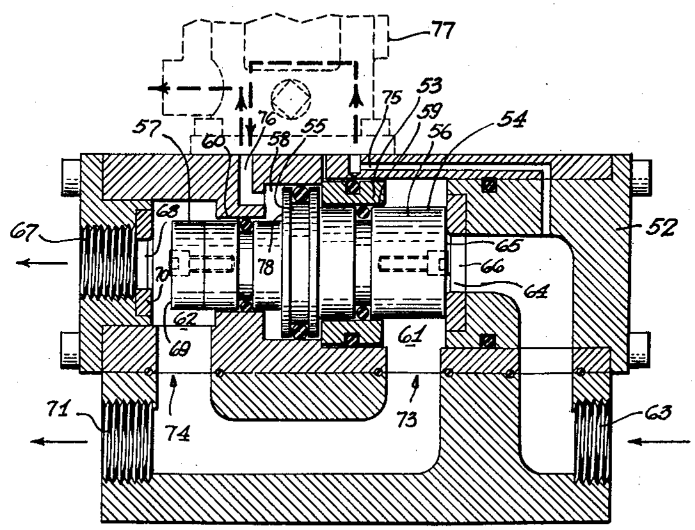

The invention will be described with reference to the accompanying drawings in which FIGURE 1 is a sectional elevation of one modification of a valve in accordance with the invention, and FIGURES 2 and 3 are sectional elevations of other modifications of such a valve.

Referring to FIGURE 1, the valve illustrated comprises a body 1 having a top cover 2 and a bottom cover 3 and forming a cylinder 4. The cylinder 4 is provided with a liner 5, which may be formed with upper and lower parts as shown. Liner 5 has an annular recess 6 intermediate the ends thereof.

Reciprocally mounted in cylinder 4 is a poppet 9 having an annular portion 10 of enlarged diameter extending into the recess 6, an upper portion 11 of less diameter than that of portion 10, and a lower portion 12 of less diameter than that of portion 11. It will be observed that the liner 5 of cylinder 4 provides corresponding cylinder sections of complementary diameter to the respective portions 10, 11 and 12 of the poppet. Moreover, body 1 has a cylindrical chamber 13 disposed below cylinder 4 and into which the poppet portion 12 extends, chamber 13 being of a substantially enlarged diameter

2 relative to poppet portion 12. The lower end of poppet 9 is provided with a facing 14 of a wear resistant cushion material such as nylon. The upper end of cylinder 4 is preferably provided with a shock absorbing facing 15 of a suitable resilient material such as that known under the trade name "Teflon." The valve body and poppet may be formed of aluminum and the liner of cast iron. Each portion of the poppet is preferably provided with an O-ring seal 17.

The valve body is provided with a fluid inlet passage 18 communicating with chamber 13 through opening 18*a* and a fluid outlet passage 19 leading from chamber 13 through opening 19*a*. Opening 19*a* is provided with a valve seat 16 for engagement by the end face 31 of poppet 9. Thus, communication between passages 18 and 19 is interrupted when the poppet is seated on valve seat 16 and established when the poppet moves upwardly off the seat. It will be observed that since the diameter of chamber 13 is substantially larger than that of poppet portion 12, full flow of fluid from inlet passage 18 to outlet passage 19 is established when the poppet moves from seat 16 into valve open position. It will be observed that, in the modification shown, the inlet and outlet are disposed in 90° relation.

Poppet 9 has an axial passage 20 extending from the upper end thereof and communicating through a smaller axial passage 21 and a plurality of inclined passages 22 with chamber 13. The top face 23 of poppet portion 10 communicates with atmosphere through a plurality of passages 24 in the liner 5 and top cover 2. The bottom face 25 of poppet portion 10 communicates through a passage 26 with a laterally extending port 27 in the valve body. A second laterally extending port 28 in the body communicates with chamber 13.

Air supply to ports 27 and 28 is controlled by a conventional electrically controlled three-way pilot valve 29, the arrangement being such that, when valve 29 is de-energized, port 27 is open to atmosphere and port 28 is closed, but when valve 29 is energized, ports 27 and 28 are in communication, port 27 being of course closed to atmosphere.

In operation, it will be understood that inlet 18 is connected to a source of fluid, such as air, under pressure, and outlet 19 is connected to the device the actuation of which is to be controlled by the valve.

With pilot valve 29 de-energized, port 27 is open to atmosphere. Fluid under pressure flowing into chamber 13 through inlet 18 flows through passages 21, 22, 20 and, since the area of the top face 30 of the poppet is greater than the area of the bottom face 31 of the poppet, the latter will engage its seat to close outlet 19 and no fluid can flow through the valve.

With pilot valve 29 energized, port 27 is pressurized by connection with port 28 and, since the area of bottom face 25 of poppet portion 10 is greater than the area of the top face 30 of the poppet, the lattter moves away from its seat and permits fluid under pressure to flow from inlet 18 through outlet 19.

Referring to FIGURE 2, the valve shown comprises a body 33 having a cylinder 34 and a poppet 35 reciprocally mounted therein. Poppet 35 has an enlarged diameter head portion 36 and a major portion 37 of reduced diameter, the cylinder having corresponding respective portions 38 and 39 of complementary diameter. The poppet portion 37 extends into a chamber 40 adjoining cylinder portion 39. A fluid inlet passage 41 communicates through opening 42, with chamber 40. Opening 42 is adapted to be closed and opened by the end face 43 of poppet 35, a valve seat 44 being provided for engagement by the poppet.

A fluid outlet passage 45 communicates through opening 46 with chamber 40. In the arrangement shown, the inlet 41 and outlet 45 are in-line.

A port 47 communicates with passage 42 and a port 48 comunicates with cylinder portion 38.

A conventional electrically operated pilot valve 49 is provided, the arrangement being such that, on de-energization thereof, ports 47 and 48 are connected, and on energization thereof, ports 47 and 48 are disconnected and port 48 is exhausted to atmosphere.

In operation, with pilot valve 49 de-energized, fluid under pressure flows from passage 41 through ports 47 and 48 to cylinder portion 38. Since the area of the end face 50 of poppet 35 is greater than the areas of the other end face 51 of the poppet the latter is forced in engagement with seat 44 to close passage 42 and arrest flow of fluid through outlet 45. With pilot valve 49 energized, port 48 is exhausted to atmosphere and pressure of inlet fluid on face 51 of the poppet causes it to leave its seat and permit flow of fluid through passages 42 and 46 and outlet 45.

It will be apparent that the valve described may be converted to normally open operation simply by substituting for the normally open pilot valve 49 a normally closed pilot valve.

Referring to FIGURE 3, the valve shown comprises a body 52 having a cylinder 53 therein and a poppet 54 reciprocally mounted in the cylinder. Poppet 54 has an intermediate portion 55 of enlarged diameter, an end portion 56 of smaller diameter, and an other end portion 57 of smaller diameter than portion 56. Cylinder 53 has corresponding respective portions 58, 59, 60 of complementary diameter. Adjoining cylinder portion 59 is a chamber 61 and adjoining cylinder portion 60 is a chamber 62. A fluid inlet passage 63 communicates through opening 64 with chamber 61 and is arranged to be opened and closed by the end face 65 of poppet 54, a valve seat 66 being provided for seating engagement therewith. An exhaust port 67 communicates through opening 68 with chamber 61 and is arranged to be opened and closed by the end face 69 of poppet 54, a valve seat 70 being provided for seating engagement therewith. A fluid outlet passage 71 communicates through openings 73 and 74 with chambers 61 and 62, respectively. A port 75 communicates with passage 64 and a port 76 communicates with cylinder portion 58.

A conventional electrically-operated pilot valve 77 is provided, the arrangement being such that, on de-energization, ports 75 and 76 are connected together, and on energization, ports 75 and 76 are disconnected and port 76 exhausted to atmosphere.

In operation, with pilot valve 77 de-energized, fluid under pressure is admitted to cylinder portion 58 through ports 75 and 76, and inlet 63. Since the area of face 78 of the poppet is greater than that of end face 65, the poppet closes passage 64 and opens outlet 71 to atmosphere through port 67.

With pilot valve 77 energized, cylinder portion 58 is exhausted to atmosphere through port 76. Since the area of end face 65 is greater than that of end face 69, the poppet moves to close exhaust port 67 and open inlet passage 64. Fluid thus flows from passage 64 into passages 74, 72 and out through outlet 71.

Valves constructed in accordance with one or the other of the modifications described herein have been tested and have been found to have a life of from 40,000,000 cycles to 60,000,000 cycles before replacement of valve seats is necessary and a life of 50,000,000 cycles before replacement of O rings is necessary. Moreover, such a valve is easily serviced, the time required to replace either O rings or valve seats being approximately ten minutes. Speeds of 3600 cycles per minute are readily obtainable with three-quarter inch valves and 85 p.s.i. air pressure. Higher speeds are obtainable using higher air pressure and/or dual pilot valves.

A valve such as described in the various modifications makes possible the following characteristics:

(1) Short stroke for high speed operation.

(2) Large area valve seats to provide required flow characteristics.

(3) Long life valve seats.

(4) Few moving parts with no springs.

(5) Elimination of parts that would be subject to fatigue fracture.

(6) Ability to predict within close limits the life expectancy of all valve parts so as to maintain a rigid service schedule.

Thus, a valve as described may have a stroke of only $\frac{3}{16}$ inch with a speed as set forth above. The flow through the valve is approximately 25% greater than conventional poppet valves of comparable size. The wear on the valve seats is only about 0.0005 inch per 1,000,000 cycles with a permissible wear of 0.030 inch before replacement is required. All movement is accomplished by pressure differentials with consequent elimination of springs and use of only one moving part.

The poppet, which is the only moving part, may be light in weight and since all sections thereof are of substantial thickness, induced stresses are so small that they are incapable of causing fatigue fracture. Since fatigue fractures do not occur and since all other wear is by abrasion only, it is quite practical to predict the life expectancy of any part within close limits.

As previously indicated, electrically controlled solenoid-operated pilot valves of three and four way types are well known in the valve industry and are available in wide variety. Many of such pilot valves are guaranteed for a minimum of 25,000,000 cycles.

The materials of construction given by way of example are suitable for air control valves but they may be changed as required in accordance with each specific application.

It will be apparent that the valves described lend themselves to association one with the other to meet a wide variety of operating conditions.

We claim:

1. A valve structure comprising a body having a cylinder therein, said cylinder having an intermediate portion of relatively large diameter a first end portion of relatively small diameter, and a second end portion of smaller diameter than said first end portion, a first chamber adjoining and of substantially greater diameter than, said first end portion, a second chamber adjoining, and of greater diameter than said second end portion, and a pair of passages in substantially parallel relation to said cylinder, one of said passages having a fluid inlet and the other of said passages having a fluid outlet, said fluid inlet passage having an opening communicating with said chamber adjoining said first end portion, said fluid outlet passage having an opening communicating with each of said chambers, a poppet reciprocally mounted in said cylinder and having small diameter portions respectively disposed in said cylinder end portions and said chambers, and a large diameter portion disposed in said large diameter cylinder portion, an end face on each of said small diameter poppet portions, and an end face on said large diameter poppet portion, the axial extent of said intermediate portion of said cylinder being substantially less than that of each of said end cylinder portions and the adjoining one of said chambers to restrict the reciprocating movement of said poppet, said cylinder and chambers being otherwise mechanically unobstructed to permit free mechanical reciprocation of said poppet in both direction, said body having a port in constant communication with said end face on said large diameter portion, and a port in constant communication with said fluid inlet passage, and a pilot valve operable to place said ports into and out of communication with each other and to place one of said ports in communication with atmosphere when said ports are out of communication, said body having an exhaust port in alignment with said cylinder and leading from said second chamber adjoining said second cylinder portion, said small diameter poppet portion in said said second chamber closing said exhaust port in one position of said poppet.

2. A valve structure comprising a body having a cylinder therein, said cylinder having an annular shoulder defining a first end portion and a second end portion of larger diameter than that of said first end portion, said cylinder also having a chamber adjoining, and of greater diameter than, said first end portion, and a pair of passages in substantially parallel relation to said cylinder, one of said passages having a fluid inlet and the other of said passages having a fluid outlet, each of said passages having an opening communicating with said chamber, a poppet reciprocally mounted in said cylinder and having a small diameter portion disposed in said first cylinder end portion and said chamber and a large diameter portion disposed in said second cylinder end portion, and an end face on each said poppet portion, the axial extent of said large diameter portion of said poppet constituting a major proportion of the axial extent of said second cylinder end portion to restrict the reciprocating movement of said poppet, said cylinder and chamber being otherwise mechanically unobstructed to permit free mechanical reciprocation of said poppet in both directions, said body having an exhaust port in axial alignment with said cylinder, said poppet having a third portion of smaller diameter than said small diameter portion and extending axially from said large diameter portion, said third poppet portion having an end face closing said exhaust port in one position of said poppet, said body having a port in constant communication with said end face on said large diameter poppet portion, and a port in constant communication with said fluid inlet passage, and a pilot valve operable to place said ports into and out of communication with each other and to place one of said ports in communication with atmosphere when said ports are out of communication.

References Cited in the file of this patent

UNITED STATES PATENTS

| | | |
|---|---|---|
| 917,740 | Anderson | Apr. 6, 1909 |
| 996,346 | Keen | June 27, 1911 |
| 1,060,288 | Rob | Apr. 29, 1913 |
| 2,208,820 | Tarris | July 23, 1940 |
| 2,329,001 | Robinson | Sept. 7, 1943 |
| 2,537,051 | Grant | Jan. 9, 1951 |